(12) United States Patent
Eguchi

(10) Patent No.: US 12,525,824 B2
(45) Date of Patent: Jan. 13, 2026

(54) WIRELESS POWER TRANSMISSION SYSTEM AND METHOD FOR CONTROLLING WIRELESS POWER TRANSMISSION SYSTEM

(71) Applicant: CANON KABUSHIKI KAISHA, Tokyo (JP)

(72) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 18/059,847

(22) Filed: Nov. 29, 2022

(65) Prior Publication Data

US 2023/0170741 A1 Jun. 1, 2023

(30) Foreign Application Priority Data

Dec. 1, 2021 (JP) ................................. 2021-195539

(51) Int. Cl.
*H02J 50/12* (2016.01)
*H02J 50/40* (2016.01)
*H02J 50/90* (2016.01)

(52) U.S. Cl.
CPC ............ *H02J 50/12* (2016.02); *H02J 50/402* (2020.01); *H02J 50/90* (2016.02)

(58) Field of Classification Search
CPC .......... H02J 50/12; H02J 50/402; H02J 50/90; B60L 5/005; B60L 9/005; B60L 15/08; B60L 2220/42
See application file for complete search history.

(56) References Cited

U.S. PATENT DOCUMENTS

| 9,511,674 B2* | 12/2016 | Keeling | .................. H02J 50/12 |
| 11,398,747 B2* | 7/2022 | Partovi | .................. H02J 50/12 |
| 12,030,394 B2* | 7/2024 | Yokoyama | ........ H02J 13/00024 |
| 2013/0175937 A1* | 7/2013 | Nakajo | ................. H02J 50/402 |
| | | | 315/276 |

(Continued)

FOREIGN PATENT DOCUMENTS

| JP | 2017099190 A | 6/2017 |
| JP | 6925569 B1 | 8/2021 |
| JP | 2021145400 A | 9/2021 |

*Primary Examiner* — Hal Kaplan
*Assistant Examiner* — Brian K Baxter
(74) *Attorney, Agent, or Firm* — Canon U.S.A., Inc., IP Division

(57) ABSTRACT

A wireless power transmission system includes a first power transmission circuit configured to output first power to be transmitted, a second power transmission circuit configured to output second power to be transmitted, a plurality of power transmission coils, a first power reception coil configured to be movable relative to the plurality of power transmission coils and wirelessly receive the first power from one of the power transmission coils, a second power reception coil configured to be movable relative to the plurality of power transmission coils and wirelessly receive the second power from one of the power transmission coils, and a first switch configured to connect a power transmission coil opposed to the first power reception coil among the plurality of power transmission coils to the first power transmission circuit, and connect a power transmission coil opposed to the second power reception coil to the second power transmission circuit.

7 Claims, 9 Drawing Sheets

(56) References Cited

U.S. PATENT DOCUMENTS

| | | | |
|---|---|---|---|
| 2013/0221913 A1* | 8/2013 | Kim | H02J 50/10 320/108 |
| 2017/0288444 A1* | 10/2017 | Komulainen | H02J 50/12 |
| 2018/0152050 A1* | 5/2018 | Ko | H02J 9/005 |
| 2019/0312452 A1* | 10/2019 | Chen | H02J 50/402 |
| 2020/0196398 A1* | 6/2020 | Ok | H05B 6/065 |
| 2021/0281118 A1* | 9/2021 | Smith | H02J 7/00034 |
| 2022/0247229 A1* | 8/2022 | Basak | H02J 50/90 |
| 2022/0259008 A1* | 8/2022 | Nakagawa | B66B 7/00 |
| 2022/0416581 A1* | 12/2022 | Ganesh | H02J 50/402 |
| 2023/0124799 A1* | 4/2023 | Miki | H02J 50/12 307/104 |
| 2023/0253834 A1* | 8/2023 | Ok | H02J 50/402 307/104 |
| 2023/0261521 A1* | 8/2023 | Lee | H02J 50/12 307/104 |
| 2023/0291242 A1* | 9/2023 | Kanakasabai | H02J 50/402 |
| 2023/0302927 A1* | 9/2023 | Cook | B60L 53/126 |
| 2023/0369916 A1* | 11/2023 | Kim | H02J 50/402 |
| 2024/0186837 A1* | 6/2024 | Basak | H02J 50/402 |
| 2024/0258844 A1* | 8/2024 | Nakanishi | H02J 50/90 |

\* cited by examiner

WIRELESS POWER TRANSMISSION SYSTEM AND METHOD FOR CONTROLLING WIRELESS POWER TRANSMISSION SYSTEM

BACKGROUND

Field

The present disclosure relates to a wireless power transmission system and a method for controlling the wireless power transmission system.

Description of the Related Art

Demand for wireless power feeding to movable units has been increasing in recent years. For example, a semiconductor exposure apparatus includes a stage for moving a wafer to an exposure position, on which a plurality of motors for finely moving the wafer to form a wafer pattern is mounted. Drivers for controlling driving of the respective motors are located outside the stage. Outputs of the drivers are connected to the motors on the stage by cables. Since the cables move along with movement of the stage, positioning accuracy of the stage drops due to tension caused by the cables.

In view of the foregoing, wirelessly connecting the drivers and the motors has been considered. To individually connect the motors and the drivers for controlling the respective motors as described above, a wireless power transmission system is required for each set containing a driver and a motor.

Japanese Patent Application Laid-Open No. 2017-99190 discusses a wireless power feeding system including a power transmission apparatus and a power reception apparatus. The power transmission apparatus includes a power feed circuit and a transmission line. The power reception apparatus includes a power reception antenna and an impedance conversion circuit.

To wirelessly feed the outputs of drivers to loads such as motors, as many power transmission apparatuses and power reception apparatuses as the number of loads can be used. Arranging a plurality of power transmission apparatuses including transmission lines results in a large footprint.

Moreover, if a plurality of power transmission apparatuses including transmission lines is juxtaposed, power interference can occur. To reduce the interference, the plurality of power transmission apparatuses can be desirably spaced apart or covered with shielding members. This further increases the footprint.

SUMMARY

Various embodiments of the present disclosure are directed to reducing the footprint of power transmission apparatuses in a wireless power transmission system.

According to one embodiment of the present disclosure, a wireless power transmission system includes a first power transmission circuit configured to output first power to be transmitted, a second power transmission circuit configured to output second power to be transmitted, a plurality of power transmission coils configured to wirelessly transmit the first power or the second power, a number of the power transmission coils being three or more, a first power reception coil configured to be movable relative to the plurality of power transmission coils and wirelessly receive the first power from one of the power transmission coils, a second power reception coil configured to be movable relative to the plurality of power transmission coils and wirelessly receive the second power from one of the power transmission coils, and a first switch configured to connect a power transmission coil opposed to the first power reception coil among the plurality of power transmission coils to the first power transmission circuit, and connect a power transmission coil opposed to the second power reception coil among the plurality of power transmission coils to the second power transmission circuit.

Further features of the present disclosure will become apparent from the following description of example embodiments with reference to the attached drawings.

DESCRIPTION OF THE EMBODIMENTS

Figure 1:
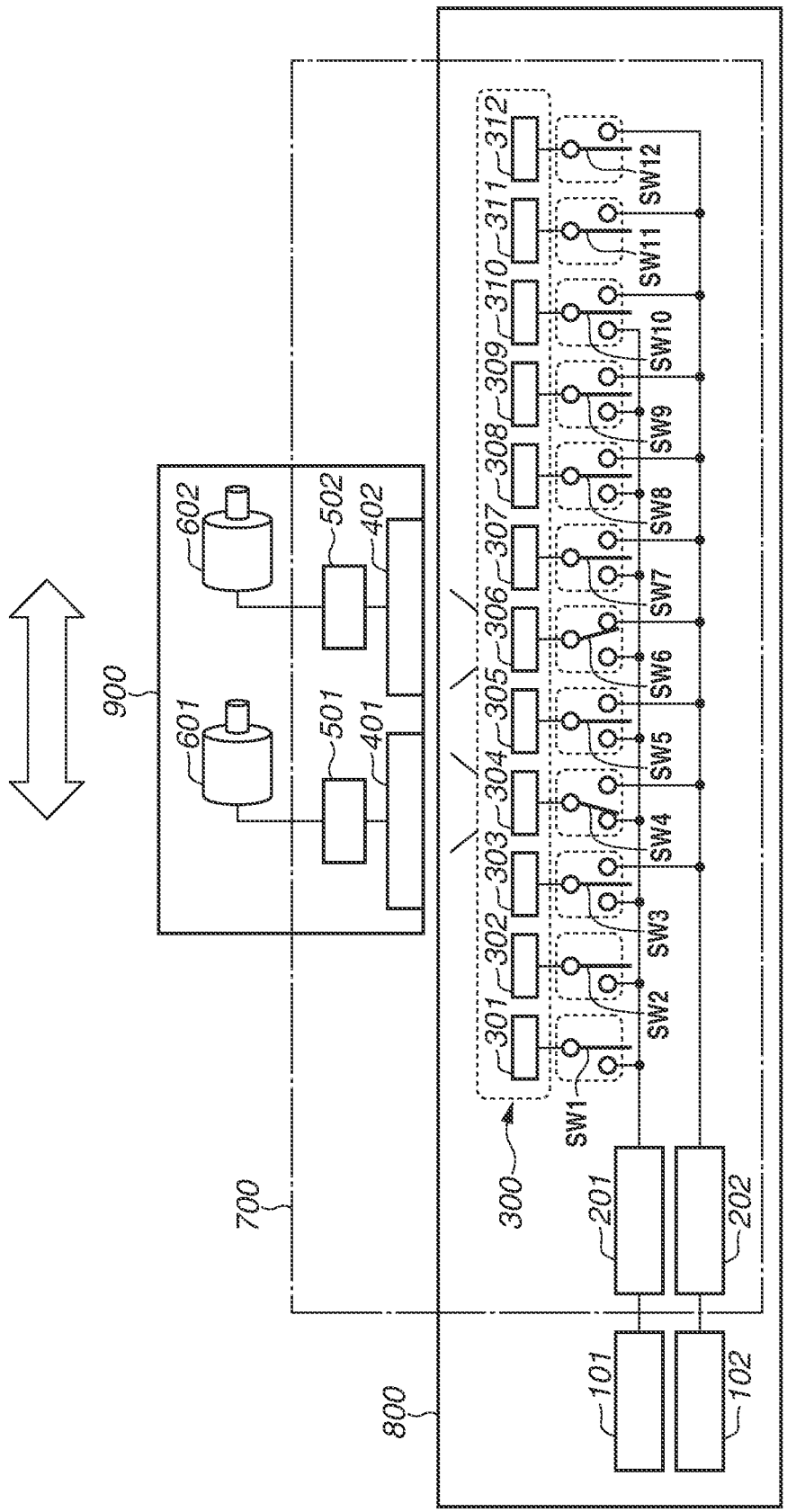
FIG. 1 is a diagram illustrating a configuration example of a wireless power transmission system according to one embodiment.

FIG. 1 is a diagram illustrating a configuration example of a wireless power transmission system 700 according to a first example embodiment.

The wireless power transmission system 700 uses a method called electromagnetic induction or magnetic resonance for transmitting power using a magnetic field, an electric field, or both an electric field and a magnetic field.

The wireless power transmission system 700 will be described by using an application to a semiconductor exposure apparatus as an example. However, this is not restrictive. For example, the wireless power transmission system 700 can be applied to an apparatus that drives a plurality of motors and apparatuses in general that drive not only motors but also control circuits, so that power can be wirelessly transmitted. For example, the wireless power transmission system 700 can be applied to an apparatus that uses a plurality of power supply systems. Examples thereof include an inkjet printer, a robot apparatus used in a factory, and an automated guided vehicle (AGV). In particular, a suitable range of applications may include a case where a plurality of wireless power transmission systems 700 is disposed within a narrow range inside an apparatus.

The wireless power transmission system 700 includes power transmission circuits 201 and 202, a power transmission coil array 300, switches SW1 to SW12, power reception coils 401 and 402, and power reception circuits 501 and 502. The power transmission coil array 300 includes power transmission coils 301 to 312.

The semiconductor exposure apparatus includes a main body 800 and a moving stage 900. The main body 800 is a power transmission apparatus, and includes drivers 101 and 102, the power transmission circuits 201 and 202, the power transmission coil array 300, and the switches SW1 to SW12. The moving stage 900 is a power reception apparatus, and includes the power reception coils 401 and 402, the power reception circuits 501 and 502, and motors 601 and 602. The moving stage 900 is movable in directions of the arrow in FIG. 1 with respect to the main body 800.

The driver 101 is connected to the power transmission circuit 201. The driver 102 is connected to the power transmission circuit 202. The switch SW1 connects and disconnects the power transmission circuit 201 to/from the power transmission coil 301. The switch SW2 connects and disconnects the power transmission circuit 201 to/from the power transmission coil 302.

The switch SW3 connects the power transmission circuit 201 to the power transmission coil 303, connects the power transmission circuit 202 to the power transmission coil 303, or disconnects the power transmission coil 303. The switch SW4 connects the power transmission circuit 201 to the power transmission coil 304, connects the power transmission circuit 202 to the power transmission coil 304, or disconnects the power transmission coil 304. Similarly, the switches SW5 to SW10 connect the power transmission circuit 201 to the power transmission coils 305 to 310, connect the power transmission circuit 202 to the power transmission coils 305 to 310, or disconnect the power transmission coils 305 to 310, respectively.

The switch SW11 connects and disconnects the power transmission circuit 202 to/from the power transmission coil 311. The switch SW12 connects and disconnects the power transmission circuit 202 to/from the power transmission coil 312.

The power reception coil 401 is connected to the motor 601 via the power reception circuit 501. The power reception coil 402 is connected to the motor 602 via the power reception circuit 502.

In a case where the wireless power transmission system 700 is applied to a semiconductor exposure apparatus, the number of motors required is three or more, whereas FIG. 1 illustrates only two motors 601 and 602. The wireless power transmission system 700 wirelessly transmits power between the main body 800 and the moving stage 900. The power transmission coil array 300 includes the plurality of power transmission coils 301 to 312 arranged in the moving directions of the moving stage 900. The switches SW1 to SW12 are connected to the power transmission coils 301 to 312, respectively. While the power transmission coil array 300 includes the 12 power transmission coils 301 to 312, the number of power transmission coils is determined by a movable range of the moving stage 900 and sizes of the respective power transmission coils and is therefore not limited to 12.

In FIG. 1, since the power reception coil 401 is opposed to the power transmission coil 304, the power transmission coil 304 is connected to the power transmission circuit 201 by the switch SW4. Similarly, since the power reception coil 402 is opposed to the power transmission coil 306, the power transmission coil 306 is connected to the power transmission circuit 202 by the switch SW6. The other switches SW1 to SW3, SW5, and SW7 to SW12 disconnect the power transmission coils 301 to 303, 305, and 307 to 312, respectively, from the power transmission circuits 201 and 202. A method for controlling the wireless power transmission system 700 will now be described.

The driver 101 for the motor 601 outputs a voltage to be supplied to the motor 601 to the power transmission circuit 201. The power transmission circuit 201 switches the output voltage of the driver 101 at a high frequency suitable for wireless power transmission. The power transmission circuit 201 outputs the switched high frequency voltage (power) to the power transmission coil 304 via the switch SW4. The power transmission coil 304 wirelessly transmits the high frequency power to the power reception coil 401. The power reception coil 401 receives the high frequency power (voltage) from the power transmission coil 304, and outputs the received high frequency voltage to the power reception circuit 501. The power reception circuit 501 rectifies the high frequency voltage received by the power reception coil 401 to restore the output voltage of the driver 101. The power reception circuit 501 outputs the restored voltage to the motor 601. The motor 601 is driven based on the voltage input from the power reception circuit 501. Here, the driver 101 can appropriately control the motor 601 by outputting extra power as much as the power loss in the wireless power transmission.

Similarly, the driver 102 for the motor 602 outputs a voltage to be supplied to the motor 602 to the power transmission circuit 202. The power transmission circuit 202 switches the output voltage of the driver 102 at a high frequency suitable for wireless power transmission. The power transmission circuit 202 outputs the switched high frequency voltage (power) to the power transmission coil 306 via the switch SW6. The power transmission coil 306 wirelessly transmits the high frequency power to the power reception coil 402. The power reception coil 402 receives the high frequency power (voltage) from the power transmission coil 306, and outputs the received high frequency voltage to the power reception circuit 502. The power reception circuit 502 rectifies the high frequency voltage received by the power reception coil 402 to restore the output voltage of the driver 102. The power reception circuit 502 outputs the restored voltage to the motor 602. The motor 602 is driven based on the voltage input from the power reception circuit 502. Here, the driver 102 can appropriately control the motor 602 by outputting extra power as much as a power loss in the wireless power transmission.

In FIG. 1, if the moving stage 900 is moved to the leftmost position, the power reception coil 401 is opposed to the power transmission coil 301, and the power reception coil 402 is opposed to the power transmission coil 303. This prevents the power transmission coils 301 and 302 from being opposed to the power reception coil 402. The switches SW1 and SW2 therefore do not have terminals for connecting the power transmission coils 301 and 302 to the power transmission circuit 202, respectively.

Similarly, in FIG. 1, if the moving stage 900 is moved to the rightmost position, the power reception coil 401 is opposed to the power transmission coil 310, and the power reception coil 402 is opposed to the power transmission coil 312. This prevents the power transmission coils 311 and 312 from being opposed to the power reception coil 401. The switches SW11 and SW12 therefore do not have terminals for connecting the power transmission coils 311 and 312 to the power transmission circuit 201, respectively. The numbers of terminals of the switches connected to the power transmission coils can thus be changed depending on the power reception coils to which the switches can be opposed.

The position of the moving stage 900 may be detected by using a sensor (not illustrated) such as an optical sensor, or by using control information about the moving stage 900. The wireless power transmission system 700 detects positions of the power reception coils 401 and 402 based on the position of the moving stage 900, and changes over the switches SW1 to SW12 connected to the power transmission coils 301 to 312.

The power transmission coils 301 and 302 are power transmission coils for transmitting power to the power reception coil 401. The power transmission coils 311 and 312 are power transmission coils for transmitting power to the power reception coil 402. The power transmission coils 303 to 310 are power transmission coils for transmitting power to the power reception coil 401 or 402. Since the power reception coils 401 and 402 share the power transmission coils 303 to 310, an area occupied by the power transmission coils 301 to 312 can be reduced to reduce the footprint of the wireless power transmission system 700 and the main body 800.

In FIG. 1, only the power transmission coils 304 and 306 are powered by the power transmission circuits 201 and 202. Since the switch SW5 is disconnected, no power is supplied to the power transmission coil 305. Interposition of the power transmission coil 305 of zero power between the power transmission coils 304 and 306 can reduce power interference between the power transmission coils 304 and 306. For such a reason, distances between the power transmission coils 301 to 312 can be reduced. Moreover, shielding members between the power transmission coils 301 to 312 can be omitted. The area occupied by the power transmission coils 301 to 312 can thereby be reduced to reduce the footprint of the wireless power transmission system 700 and the main body 800.

Figure 2:
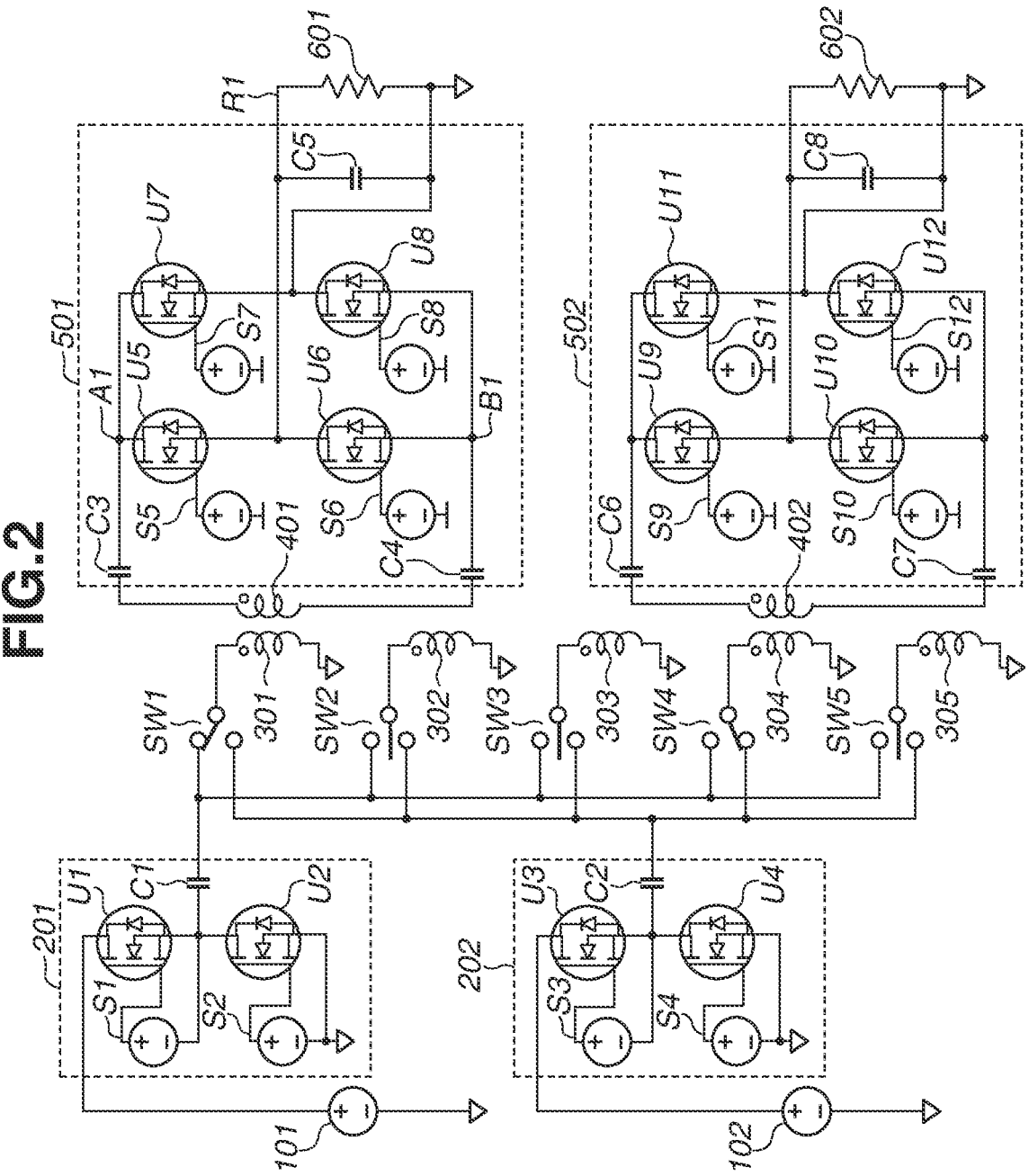
FIG. 2 is a diagram illustrating a configuration example of a wireless power transmission system according to one embodiment.

FIG. 2 is a diagram illustrating a configuration example of a wireless power transmission system 700 according to a second example embodiment.

As in FIG. 1, the wireless power transmission system 700 includes power transmission circuits 201 and 202, switches SW1 to SW5, power transmission coils 301 to 305, power reception coils 401 and 402, and power reception circuits 501 and 502. A driver 101 is connected to the power transmission circuit 201. A driver 102 is connected to the power transmission circuit 202. A motor 601 is connected to the power reception circuit 501. A motor 602 is connected to the power reception circuit 502.

The power transmission circuit 201 includes field effect transistors (FETs) U1 and U2 and a capacitor C1. The FETs U1 and U2 are a switch for alternately switching output of the driver (power supply) 101. A gate signal S1 having a frequency f1 is input to the gate of the FET U1. The drain of the FET U1 is connected to the driver 101. The source of the FET U1 is connected to the drain of the FET U2. A gate signal S2 having the frequency f1 is input to the gate of the FET U2. The source of the FET U2 is connected to a reference potential node (for example, a ground potential node). The capacitor C1 is connected between the source of the FET U1 and first terminals of the switches SW1 to SW5.

The power transmission circuit 202 includes FETs U3 and U4 and a capacitor C2. The FETs U3 and U4 are each a bidirectional switch. A gate signal S3 having a frequency f2 is input to the gate of the FET U3. The drain of the FET U3 is connected to the driver 102. The source of the FET U3 is connected to the drain of the FET U4. A gate signal S4 having the frequency f2 is input to the gate of the FET U4. The source of the FET U4 is connected to the reference potential node. The capacitor C2 is connected between the source of the FET U3 and second terminals of the switches SW1 to SW5.

The switch SW1 connects and disconnects the power transmission coil 301 to/from the power transmission circuit 201, and connects and disconnects the power transmission coil 301 to/from the power transmission circuit 202. The switch SW2 connects and disconnects the power transmission coil 302 to/from the power transmission circuit 201, and connects and disconnects the power transmission coil 302 to/from the power transmission circuit 202. Similarly, the switches SW3 to SW5 connect and disconnect the power transmission coils 303 to 305 to/from the power transmission circuit 201, and connect and disconnect the power transmission coils 303 to 305 to/from the power transmission circuit 202, respectively. The power transmission coils 301 to 305 can each wirelessly transmit power to the power reception coils 401 or 402.

For simplicity of description, the power transmission circuits 201 and 202 here are configured as a class-D half bridge circuit to be connected to either terminal of each of the power transmission coils 301 to 305. However, the power transmission circuits 201 and 202 may be class-DE or -E half bridge circuits. The power transmission circuits 201 and 202 may be configured as a full bridge circuit for controlling the voltage across both terminals of each of the power transmission coils 301 to 305. The switches provided by the respective FETs U1 to U4 can switch only positive outputs of the drivers 101 and 102. However, this is not restrictive. The switches may be bidirectional switches using two source-connected FETs so that negative outputs of the drivers 101 and 102 can also be switched.

The power reception coil 401 can wirelessly receive power from one of the power transmission coils 301 to 305. The power reception coil 402 can wirelessly receive power from one of the power transmission coils 301 to 305.

The power reception circuit 501 includes FETs U5 to U8 and capacitors C3 to C5. The FETs U5 and U6 are switches turned on and off by gate signals S5 and S6, respectively, that are switched based on the voltage applied to the power reception coil 401. Similarly, the FETs U7 and U8 are switches turned on and off by gate signals S7 and S8, respectively.

The gate signal S5 having the frequency f1 is input to the gate of the FET U5. The drain of the FET U5 is connected to a first terminal of the power reception coil 401 via the capacitor C3. The source of the FET U5 is connected to a first terminal of the motor 601.

The gate signal S6 having the frequency f1 is input to the gate of the FET U6. The drain of the FET U6 is connected to the first terminal of the motor 601. The source of the FET U6 is connected to a second terminal of the power reception coil 401 via the capacitor C4.

The gate signal S7 having the frequency f1 is input to the gate of the FET U7. The drain of the FET U7 is connected to the first terminal of the power reception coil 401 via the capacitor C3. The source of the FET U7 is connected to a second terminal of the motor 601.

The gate signal S8 having the frequency f1 is input to the gate of the FET U8. The drain of the FET U8 is connected to the second terminal of the motor 601. The source of the FET U8 is connected to the second terminal of the power reception coil 401 via the capacitor C4. The capacitor C5 is connected between the source of the FET U5 and the source of the FET U7.

The power reception circuit 502 includes FETs U9 to U12 and capacitors C6 to C8. The FETs U9 and U10 are switches turned on and off by gate signals S9 and S10, respectively, that are switched based on the voltage applied to the power reception coil 402. Similarly, the FETs U11 and U12 are switches turned on and off by gate signals S11 and S12, respectively.

The gate signal S9 having the frequency f2 is input to the gate of the FET U9. The drain of the FET U9 is connected to a first terminal of the power reception coil 402 via the capacitor C6. The source of the FET U9 is connected to a first terminal of the motor 602.

The gate signal S10 having the frequency f2 is input to the gate of the FET U10.

The drain of the FET U10 is connected to the first terminal of the motor 602. The source of the FET U10 is connected to a second terminal of the power reception coil 402 via the capacitor C7.

The gate signal S11 having the frequency f2 is input to the gate of the FET U11.

The drain of the FET U11 is connected to the first terminal of the power reception coil 402 via the capacitor C6. The source of the FET U11 is connected to a second terminal of the motor 602.

The gate signal S12 having the frequency f2 is input to the gate of the FET U12.

The drain of the FET U12 is connected to the second terminal of the motor 602. The source of the FET U12 is connected to the second terminal of the power reception coil 402 via the capacitor C7. The capacitor C8 is connected between the source of the FET U9 and the source of the FET U11.

For simplicity of description, the power reception circuits 501 and 502 here are configured as class-D full bridge rectifiers. However, the power reception circuits 501 and 502 may be configured as half bridge circuits with the potential at the neutral point between the power reception coils 401 and 402 as a reference potential. The power reception circuits 501 and 502 may be configured as class-DE or -E switching circuits.

The FETs U5 to U8 and U9 to U12 may be bidirectional switches including two source-connected FETs each.

Each of the motors 601 and 602 is a load. There may be three or more motors. Since the number of motors 601 and 602 is two, the numbers of drivers 101 and 102, power transmission circuits 201 and 202, power reception coils 401 and 402, and power reception circuits 501 and 502 are also two each. However, the numbers of components can be changed depending on the number of motors.

The number of switches SW1 to SW5 and the number of power transmission coils 301 to 305 are five. However, this is not restrictive. The number of switches and the number of power transmission coils can be changed depending on a moving distance of the moving stage 900 in FIG. 1 and the sizes of the power transmission coils 301 to 305.

Figure 3:
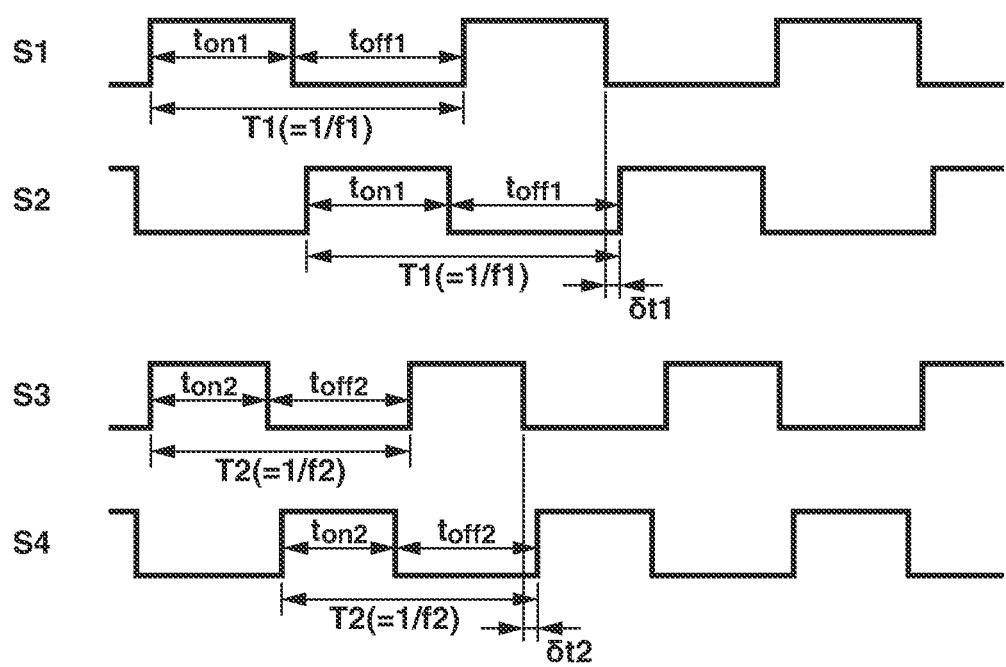
FIG. 3 is a diagram illustrating examples of gate signals according to one embodiment.

FIG. 3 is a timing chart illustrating examples of the gate signals S1 to S4 in FIG. 2. The gate signals S1 and S2 become a high level and a low level in a period T1 that is the reciprocal of the frequency f1. The gate signals S1 and S2 are different in phase by one half of the period T1 (=T1/2). The FET U1 turns on in a high level period $t_{on1}$ of the gate signal S1, and turns off in a low level period $t_{off1}$ of the gate signal S1. The FET U2 turns on in a high level period tone of the gate signal S2, and turns off in a low level period $t_{off1}$ of the gate signal S2. The high level periods $t_{on1}$ of the gate signals S1 and S2 are shorter than the low level periods $t_{off1}$ of the gate signals S1 and S2 by 2×δt1 so that the FETs U1 and U2 are not on at the same time. The capacitor C1 is set to operate as a series resonant circuit with a resonant frequency of f1 when connected to one of the power transmission coils 301 to 305.

The gate signals S3 and S4 become a high level and a low level in a period T2 that is the reciprocal of the frequency f2. The gate signals S3 and S4 are different in phase by one half of the period T2 (=T2/2). The FET U3 turns on in a high level period $t_{on2}$ of the gate signal S3, and turns off in a low level period $t_{off2}$ of the gate signal S3. The FET U4 turns on in a high level period $t_{on2}$ of the gate signal S4, and turns off in a low level period $t_{off2}$ of the gate signal S4. The high level periods $t_{on2}$ of the gate signals S3 and S4 are shorter than the low level periods $t_{off2}$ of the gate signals S3 and S4 by 2×δt2 so that the FETs U3 and U4 are not on at the same time. The capacitor C2 is set to operate as a series resonant circuit with a resonant frequency being the frequency f2 when connected to one of the power transmission coils 301 to 305. The frequency f2 is different from the frequency f1.

Next, an operation of the power reception circuit 501 will be described. The power reception circuit 501 is a synchronous rectifier circuit, and receives the voltage for the motor 601 converted into the frequency f1 from the power reception coil 401. For simplicity of description, the voltage for the motor 601 shall be a constantly positive voltage of 0 V or higher. A voltage A1 of FIG. 2 is the drain voltage of the FET U5. A voltage B1 of FIG. 2 is the source voltage of the FET U6. With the power reception coil 401 not receiving an interference signal, the gate signals S5 and S8 turn on the FETs U5 and U8 in a period where the voltage A1 is higher than the voltage B1. As a result, a current flows from the FET U5 to the FET U8 via the motor 601. A voltage R1 at the source of the FET U5 is positive.

The gate signals S5 and S8 turn on and off the FETs U5 and U8 at the same frequency f1 as that of the power transmission circuit 201. The gate signals S6 and S7 are different from the gate signals S5 and S8 in phase by 180°. The gate signals S6 and S7 turn on and off the FETs U6 and U7 in opposite phase to and at the same frequency f1 as those of the gate signals S5 and S8. More specifically, the gate signals S6 and S7 turn on the FETs U6 and U7 in a period where the voltage B1 is higher than the voltage A1. As a result, a current flows from the FET U6 to the FET U7 via the motor 601. The voltage R1 at the drain of the FET U6 is positive.

An operation of the power reception circuit 502 is similar to that of the power reception circuit 501.

Figure 4:
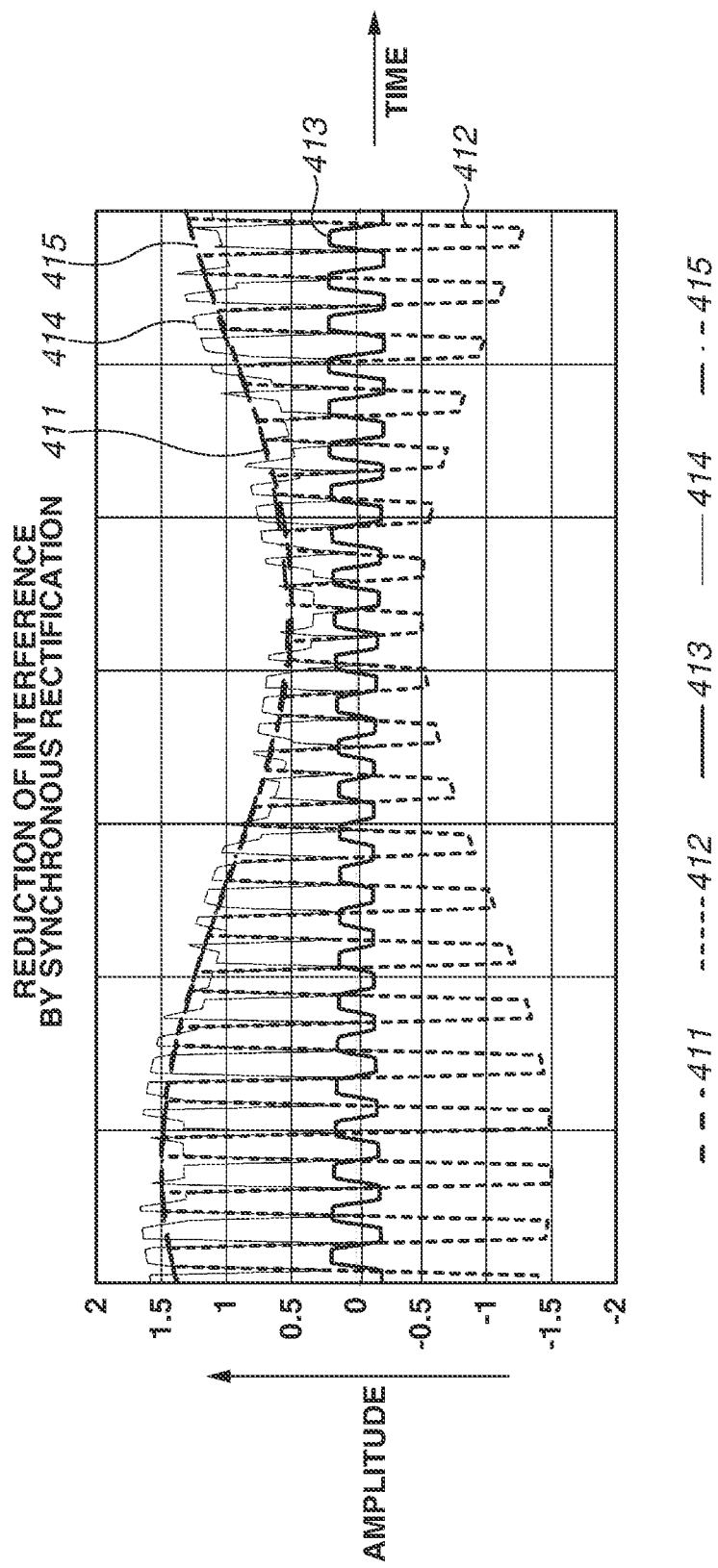
FIG. 4 is a diagram illustrating an interference reduction effect of synchronous rectification by a power reception circuit according to one embodiment.

FIG. 4 is a diagram illustrating an interference reduction effect of the synchronous rectification by the power reception circuit 501. In FIG. 4, the vertical axis indicates amplitude, and the horizontal axis indicates time. Signals 411 to 415 are signals for describing a principle of how the power reception circuit 501 reduces the effect of an interference signal having the frequency f2 different from the frequency f1, and not intended to limit signals. For the purpose of description of the principle, amplitudes of the signals 411 to 415 are values calculated in a case where there is no loss due to the wireless power transmission.

The power transmission circuit 201 switches the output signal of the driver 101 at the frequency f1. The power transmission coil 301 wirelessly transmits the output signal of the power transmission circuit 201 having the frequency f1 to the power reception coil 401. The power transmission circuit 202 switches the output signal of the driver 102 at the frequency f2.

The power transmission coil 304 wirelessly transmits the output signal of the power transmission circuit 202 having the frequency f2 to the power reception coil 402. The power reception coil 401 receives the output signal of the power transmission circuit 201 having the frequency f1 from the power transmission coil 301 and an interference signal having the frequency f2 from the power transmission coil 304.

The signal 411 represents the output signal of the driver 101. The power transmission circuit 201 switches the output signal 411 of the driver 101. The signal 412 represents the output signal of the power transmission circuit 201 received by the power reception coil 401 via the power transmission coil 301. The signal 412 has the frequency f1. The signal 413 represents the interference signal that is the output signal of the power transmission circuit 202 received by the power reception coil 401 via the power transmission coil 304. The signal 413 has a smaller amplitude than that of the signal 412 and the frequency f2. The signal 414 is a signal obtained by the FETs U5 to U8 of the power reception circuit 501 rectifying the combined signal of the signals 412 and 413. The signal 414 is yet to be smoothed by the capacitor C5. The signal 415 is the signal 414 smoothed by the capacitor C5 of the power reception circuit 501. For ease of understanding, the signal 415 indicates a signal in a case where the capacitor C5 is replaced with a high order low-pass filter.

The smoothed signal 415 is the signal restored by the power reception circuit 501. The smoothed signal 415 is substantially the same as the output signal 411 of the driver 101. It can be seen that even if the interference signal 413 gets mixed in with the reception signal 412 of the power reception coil 401, the effect of the interference signal 413 is reduced. The power reception circuit 501 can restore substantially the same signal 415 as the output signal 411 of the driver 101 despite mixing of the interference signal 413.

Here, the FETs U5 to U8 rectify the signal received by the power reception coil 401 at the frequency f1 and output the signal 414. The signal 414 contains a beat frequency component due to the interference between the signal 412 of the frequency f1 and the interference signal 413 of the frequency f2. The capacitor C5 removes the beat frequency component of the signal 414 to generate the smoothed signal 415. The capacitor C5 can therefore be replaced with a high order low-pass filter.

In a case where the motor 601 hardly reacts to the beat frequency component of the frequencies f1 and f2, the capacitor C5 can have a capacitance just enough to prevent leakage of the frequency f1 and the beat frequency component from affecting other devices. An operation of the power reception circuit 502 in FIG. 2 is similar to the foregoing operation of the power reception circuit 501.

A wireless power transmission system 700 according to a third example embodiment has a similar configuration to that of FIG. 2. Differences of the present example embodiment from the second example embodiment will be described below.

Figure 5:
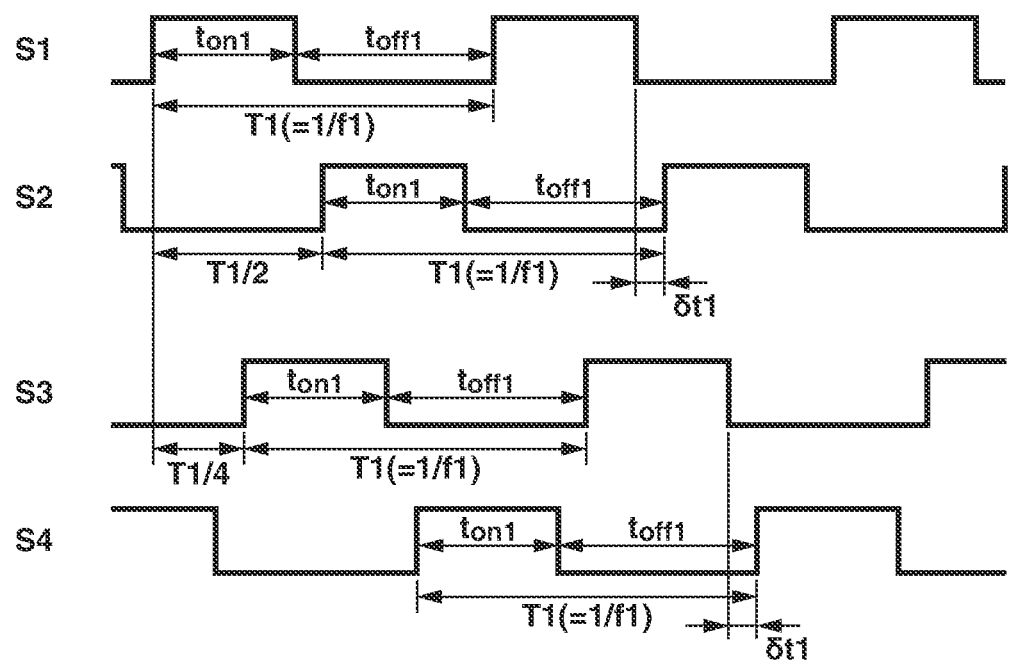
FIG. 5 is a diagram illustrating examples of gate signals according to one embodiment.

FIG. 5 is a diagram illustrating examples of the gate signals S1 to S4 according to the third example embodiment. The gate signals S1 and S2 of FIG. 5 are the same as the gate signals S1 and S2 of FIG. 3, respectively. The gate signals S1 and S2 become a high level and a low level in a period T1 that is the reciprocal of the frequency f1. The gate signals S1 and S2 are different in phase by one half of the period T1 (=T1/2). The high level periods $t_{on1}$ of the gate signals S1 and S2 are shorter than the low level periods $t_{off1}$ of the gate signals S1 and S2 by 2×δt1. The FET U1 turns on in the high level period tone of the gate signal S1, and turns off in the low level period $t_{off1}$ of the gate signal S1. The FET U2 turns on in the high level period $t_{on1}$ of the gate signal S2, and turns off in the low level period $t_{off1}$ of the gate signal S2.

The gate signals S3 and S4 also become a high level and a low level in the period T1 that is the reciprocal of the frequency f1. The gate signals S3 and S4 are different in phase by one half of the period T1 (=T1/2). The high level periods $t_{on1}$ of the gate signals S3 and S4 are shorter than the low level periods $t_{off1}$ of the gate signals S3 and S4 by 2×δt1.

The phase of the gate signal S3 is different from that of the gate signal S1 by ¼ of the period T1 (=T1/4). The phase of the gate signal S4 is different from that of the gate signal S2 by ¼ of the period T1 (=T1/4). The FET U3 turns on in the high level period $t_{on1}$ of the gate signal S3, and turns off in the low level period $t_{off1}$ of the gate signal S3. The FET U4 turns on in the high level period t of the gate signal S4, and turns off in the low level period $t_{off1}$ of the gate signal S4.

The capacitors C1 and C2 of FIG. 2 have the same capacitance, and each resonate with one of the power transmission coils 301 to 305 at the frequency f1.

The FETs U1 and U2 of the power transmission circuit 201 switch at the frequency f1 based on the gate signals S1 and S2, respectively. The FETs U3 and U4 of the power transmission circuit 202 switch at the frequency f1 based on the gate signals S3 and S4, respectively. The gate signals S3 and S4 are different from the gate signals S1 and S2 by 90° in phase. The switching timing of the power transmission circuit 202 is thus different from that of the power transmission circuit 201 by 90°.

The gate signals S5 to S8 of FIG. 2 correspond to the gate signals S1 and S2, and have the frequency f1 and the period T1 (=1/f1). The gate signals S9 to S12 of FIG. 2 correspond to the gate signals S3 and S4, and have the frequency f1 and the period T1 (=1/f1). The phases of the gate signals S9 to S12 are different from those of the gate signals S5 to S8 by ¼ of the period T1 (=T1/4), respectively.

The FETs U5 to U8 of the power reception circuit 501 switch at the frequency f1. The switching timing is similar to that in the second example embodiment, and for suitable rectification, with a phase difference of α° with reference to the switching timing of the power transmission circuit 201.

The FETs U9 to U12 of the power reception circuit 502 switch at the frequency f1. For suitable rectification, the switching timing has a phase difference of α°+90° with reference to the switching timing of the power transmission circuit 201.

Figure 6:
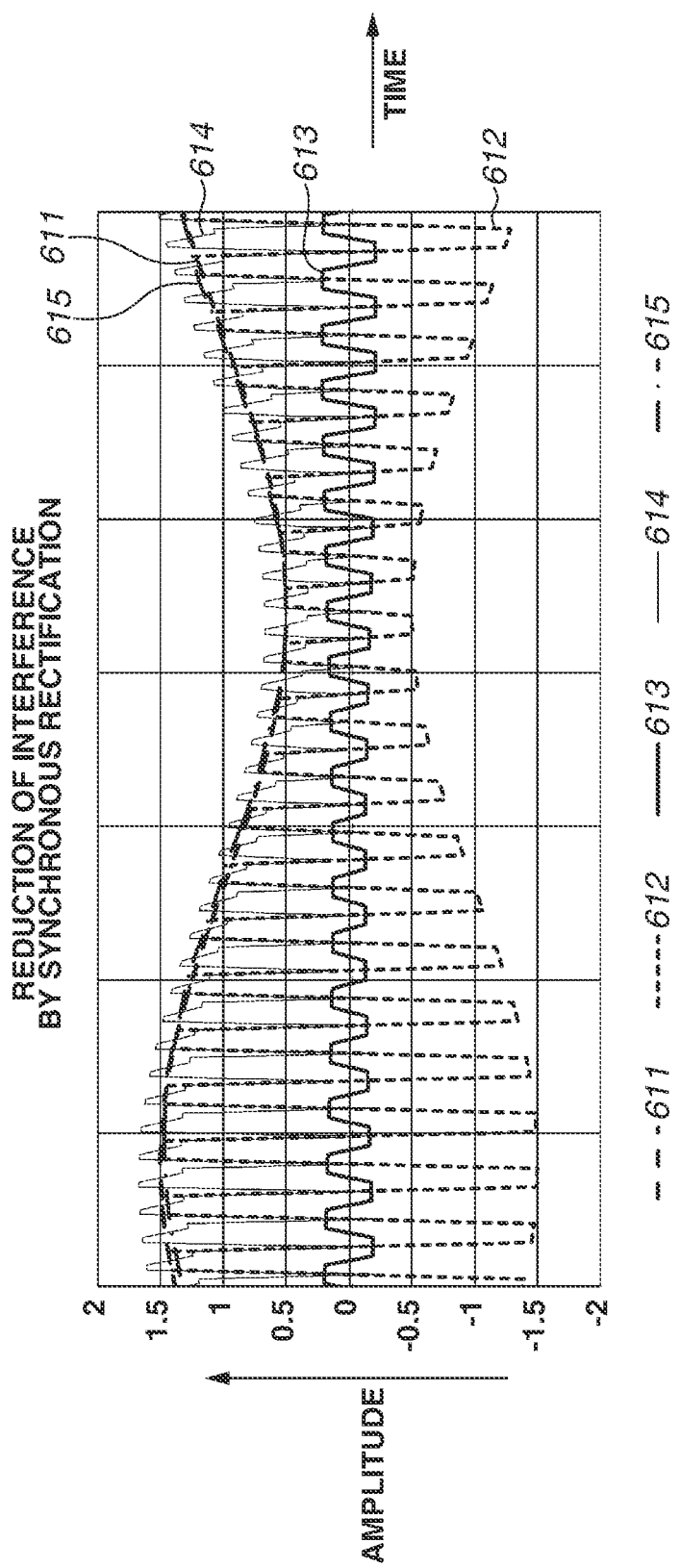
FIG. 6 is a diagram illustrating an interference reduction effect of synchronous rectification by a power reception circuit according to one embodiment.

FIG. 6 is a diagram illustrating the interference reduction effect of the synchronous rectification by the power reception circuit 501. In FIG. 6, the vertical axis indicates amplitude, and the horizontal axis indicates time. Signals 611 to 615 are signals for describing a principle of how the power reception circuit 501 reduces the effect of an interference signal in the case where the gate signals S1 and S2 and the gate signals S3 and S4 are different in phase, and not intended to limit signals. For the purpose of description of the principle, amplitudes of the signals 611 to 615 are values calculated in a case where there is no loss due to the wireless power transmission.

The power transmission circuit 201 switches the output signal of the driver 101 at the timing of the 0-degree gate signals S1 and S2. The power transmission coil 301 wirelessly transmits the output signal of the power transmission circuit 201 to the power reception coil 401. The power transmission circuit 202 switches the output signal of the driver 102 at the timing of the 90-degree gate signals S3 and S4. The power transmission coil 304 wirelessly transmits the output signal of the power transmission circuit 202 to the power reception coil 402. The power reception coil 401 receives the output signal of the power transmission circuit 201 from the power transmission coil 301 and an interference signal from the power transmission coil 304.

The signal 611 represents the output signal of the driver 101. The power transmission circuit 201 switches the output signal 611 of the driver 101 at the timing of the 0-degree gate signals S1 and S2. The signal 612 represents the output signal of the power transmission circuit 201 received by the power reception coil 401 via the power transmission coil 301. The signal 612 has a phase of 0°. The signal 613 represents the interference signal that is the output signal of the power transmission circuit 202 received by the power reception coil 401 via the power transmission coil 304. The signal 613 has a smaller amplitude than that of the signal 612 and a phase of 90°. The signal 614 is a signal obtained by the FETs U5 to U8 of the power reception circuit 501 rectifying the combined signal of the signals 612 and 613. The signal 614 is yet to be smoothed by the capacitor C5. The signal 615 is the signal 614 smoothed by the capacitor C5 of the power reception circuit 501. For ease of understanding, the signal 615 indicates a signal in a case where the capacitor C5 is replaced with a high order low-pass filter.

The smoothed signal 615 is the signal restored by the power reception circuit 501. The smoothed signal 615 is substantially the same as the output signal 611 of the driver 101. It can be seen that even if the interference signal 613 gets mixed in with the reception signal 612 of the power reception coil 401, the effect of the interference signal 613 is reduced. The power reception circuit 501 can restore substantially the same signal 615 as the output signal 611 of the driver 101 despite mixing of the interference signal 613.

Here, the FETs U5 to U8 rectify the signal received by the power reception coil 401 and output the signal 614. The signal 614 contains a noise component due to the interference between the signal 612 of 0° in phase and the interference signal 613 of 90° in phase. The capacitor C5 removes the noise component of the signal 614 to generate the smoothed signal 615. The capacitor C5 can therefore be replaced with a high order low-pass filter.

In a case where the motor 601 hardly reacts to the noise component, the capacitor C5 can have a capacitance just enough to prevent leakage of the noise component from affecting other devices. An operation of the power reception circuit 502 in FIG. 2 is similar to the foregoing operation of the power reception circuit 501.

Figure 7:
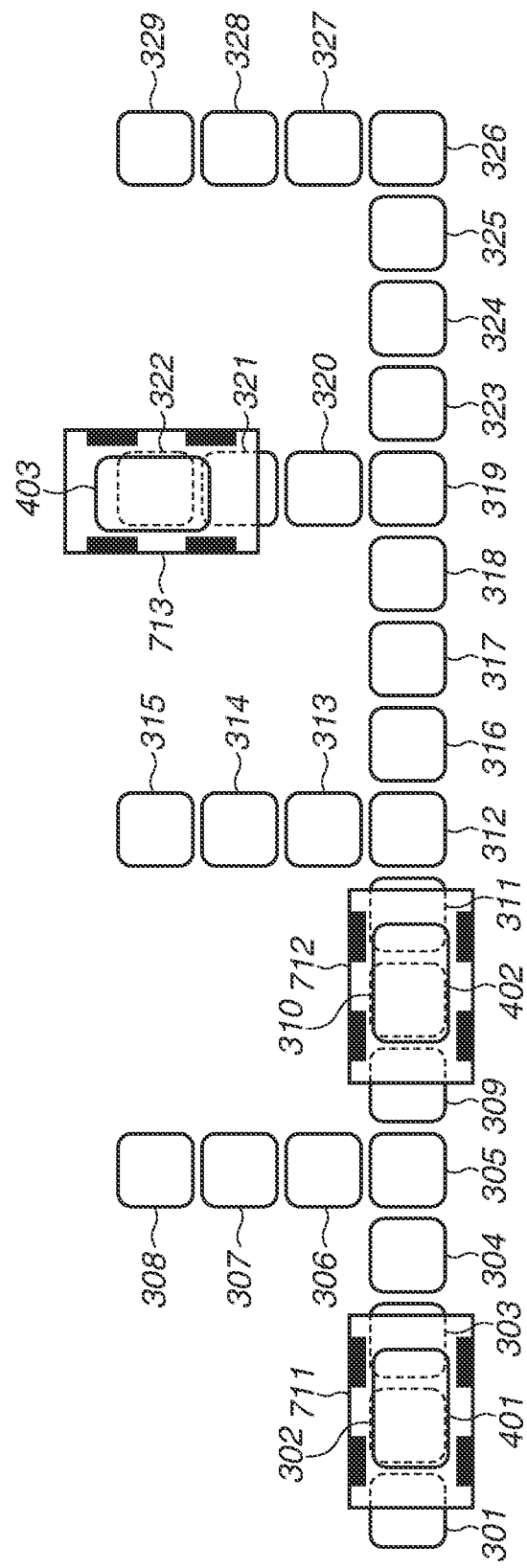
FIG. 7 is a diagram illustrating a configuration example of a wireless power transmission system according to one embodiment.

FIG. 7 is a diagram illustrating a configuration example of a wireless power transmission system 700 according to a fourth example embodiment.

The wireless power transmission system 700, in the example, is applied to a system including AGVs 711 to 713, and includes power transmission coils 301 to 329, and the three AGVs 711 to 713. The AGV 711 includes a power reception coil 401, the AGV 712 includes a power reception coil 402, and the AGV 713 includes a power reception coil 403. A power transmission coil array 300 including the power transmission coils 301 to 329 is installed on the floor. The three AGVs 711 to 713 move on the power transmission coils 301 to 329. The AGVs 711 to 713 each include a load such as a motor 601.

While FIG. 7 illustrates the example with three AGVs 711 to 713, the number of AGVs is not limited in particular. The power transmission coil array 300 is not intended to limit the number of power transmission coils 301 to 329 or a configuration of branches, either.

In the present example embodiment, the wireless power transmission system 700 can wirelessly transmit power to the power reception coils 401 to 403 from some of the power transmission coils 301 to 329 even if the AGVs 711 to 713 move on the branched power transmission coil array 300.

Figure 8:
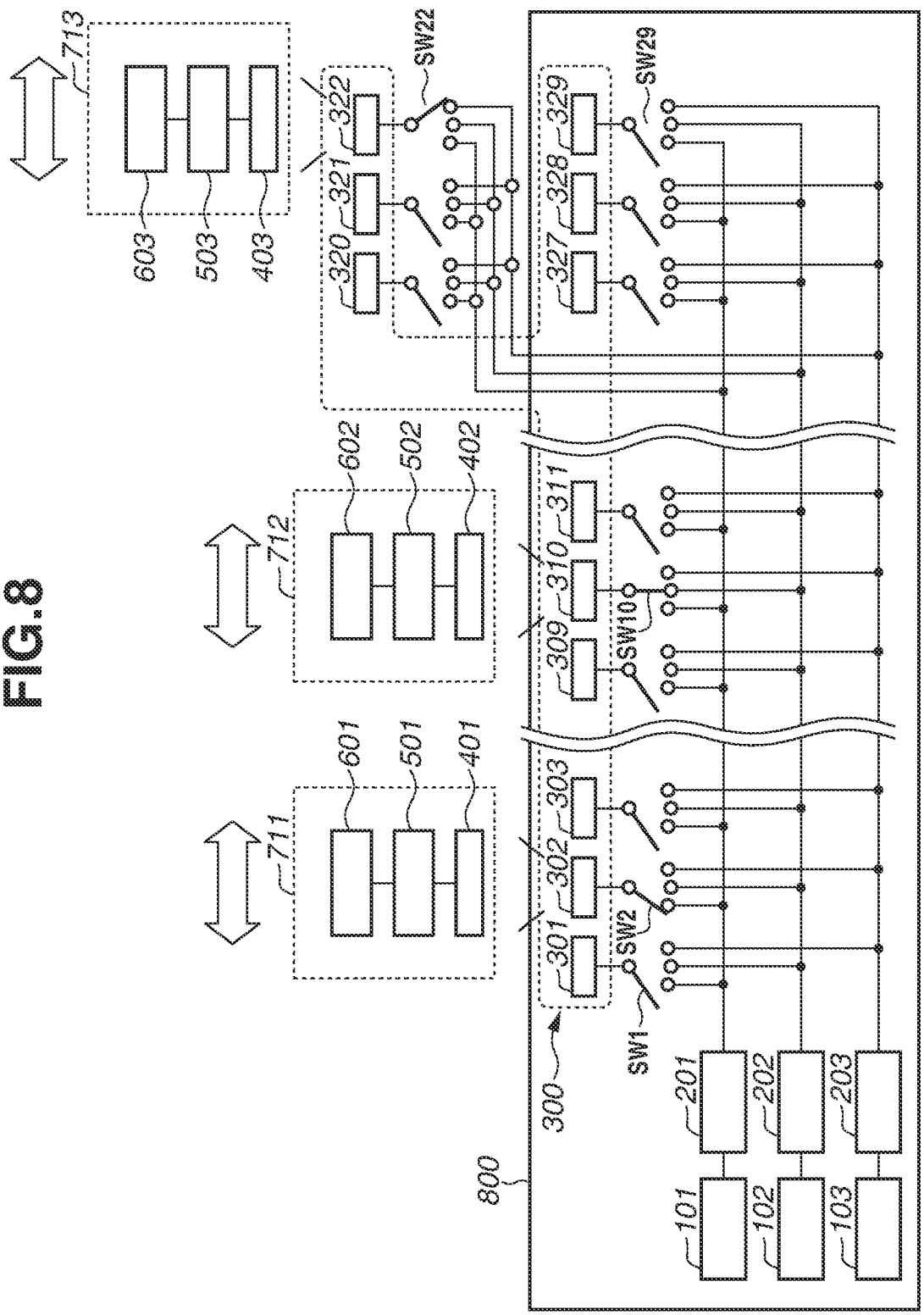
FIG. 8 is a diagram illustrating a configuration example of a wireless power transmission system according to one embodiment.

FIG. 8 is a diagram illustrating a configuration example of the wireless power transmission system 700 according to the fourth example embodiment.

The wireless power transmission system 700 includes drivers 101 to 103, power transmission circuits 201 to 203, switches SW1 to SW29, the power transmission coil array 300, and the AGVs 711 to 713. The power transmission coil array 300 includes the power transmission coils 301 to 329. The AGV 711 includes the power reception coil 401, a power reception circuit 501, and the motor 601. The AGV 712 includes the power reception coil 402, a power reception circuit 502, and a motor 602. The AGV 713 includes the power reception coil 403, a power reception circuit 503, and a motor 603. The AGVs 711 to 713 can move in the directions of the respective arrows in FIG. 8.

The switch SW1 connects one of the power transmission circuits 201 to 203 to the power transmission coil 301 or disconnects the power transmission coil 301. Similarly, the switches SW2 to SW29 connect one of the power transmission circuits 201 to 203 to the power transmission coils 302 to 329 or disconnect the power transmission coils 302 to 329, respectively.

The power reception coil 401 can wirelessly receive the output voltage of the power transmission circuit 201 from one of the power transmission coils 301 to 329. The power reception coil 402 can wirelessly receive the output voltage of the power transmission circuit 202 from one of the power transmission coils 301 to 329. The power reception coil 403 can wirelessly receive the output voltage of the power transmission circuit 203 from one of the power transmission coils 301 to 329.

In FIG. 8, the driver 101 for the motor 601 outputs a voltage to be supplied to the motor 601 to the power transmission circuit 201. The power transmission circuit 201 switches the output voltage of the driver 101 at a high frequency suitable for wireless power transmission. The power transmission circuit 201 outputs the switched high frequency voltage (power) to the power transmission coil 302 via the switch SW2. The power transmission coil 302 wirelessly transmits the high frequency power to the power reception coil 401. The power reception coil 401 receives the high frequency power (voltage) from the power transmission coil 302, and outputs the received high frequency voltage to the power reception circuit 501. The power reception circuit 501 rectifies the high frequency voltage received by the power reception coil 401 to restore the output voltage of the driver 101. The power reception circuit 501 outputs the restored voltage to the motor 601. The motor 601 is driven based on the voltage input from the power reception circuit 501.

The driver 102 for the motor 602 outputs a voltage to be supplied to the motor 602 to the power transmission circuit 202. The power transmission circuit 202 switches the output voltage of the driver 102 at a high frequency suitable for wireless power transmission. The power transmission circuit 202 outputs the switched high frequency voltage (power) to the power transmission coil 310 via the switch SW10. The power transmission coil 310 wirelessly transmits the high frequency power to the power reception coil 402. The power reception coil 402 receives the high frequency power (voltage) from the power transmission coil 310, and outputs the received high frequency voltage to the power reception circuit 502. The power reception circuit 502 rectifies the high frequency voltage received by the power reception coil 402 to restore the output voltage of the driver 102. The power reception circuit 502 outputs the restored voltage to the motor 602. The motor 602 is driven based on the voltage input from the power reception circuit 502.

The driver 103 for the motor 603 outputs a voltage to be supplied to the motor 603 to the power transmission circuit 203. The power transmission circuit 203 switches the output voltage of the driver 103 at a high frequency suitable for wireless power transmission. The power transmission circuit 203 outputs the switched high frequency voltage (power) to the power transmission coil 322 via the switch SW22. The power transmission coil 322 wirelessly transmits the high frequency power to the power reception coil 403. The power reception coil 403 receives the high frequency power (voltage) from the power transmission coil 322, and outputs the received high frequency voltage to the power reception circuit 503. The power reception circuit 503 rectifies the high frequency voltage received by the power reception coil 403 to restore the output voltage of the driver 103. The power reception circuit 503 outputs the restored voltage to the motor 603. The motor 603 is driven based on the voltage input from the power reception circuit 503.

As described above, the AGVs 711 to 713 can move with respect to the power transmission coils 301 to 329. In FIG. 8, the power reception coils 401 to 403 wirelessly receive power from the power transmission coils 302, 310, and 322 opposed to the power reception coils 401 to 403, respectively, among the power transmission coils 301 to 329. Since the power transmission coil array 300 is branched, the AGVs 711 to 713 can switch places with each other. The positions of the AGVs 711 to 713 can be obtained from position control information about the AGVs 711 to 713 or from optical sensors (not illustrated) or a surveillance camera (not illustrated).

Figure 9:
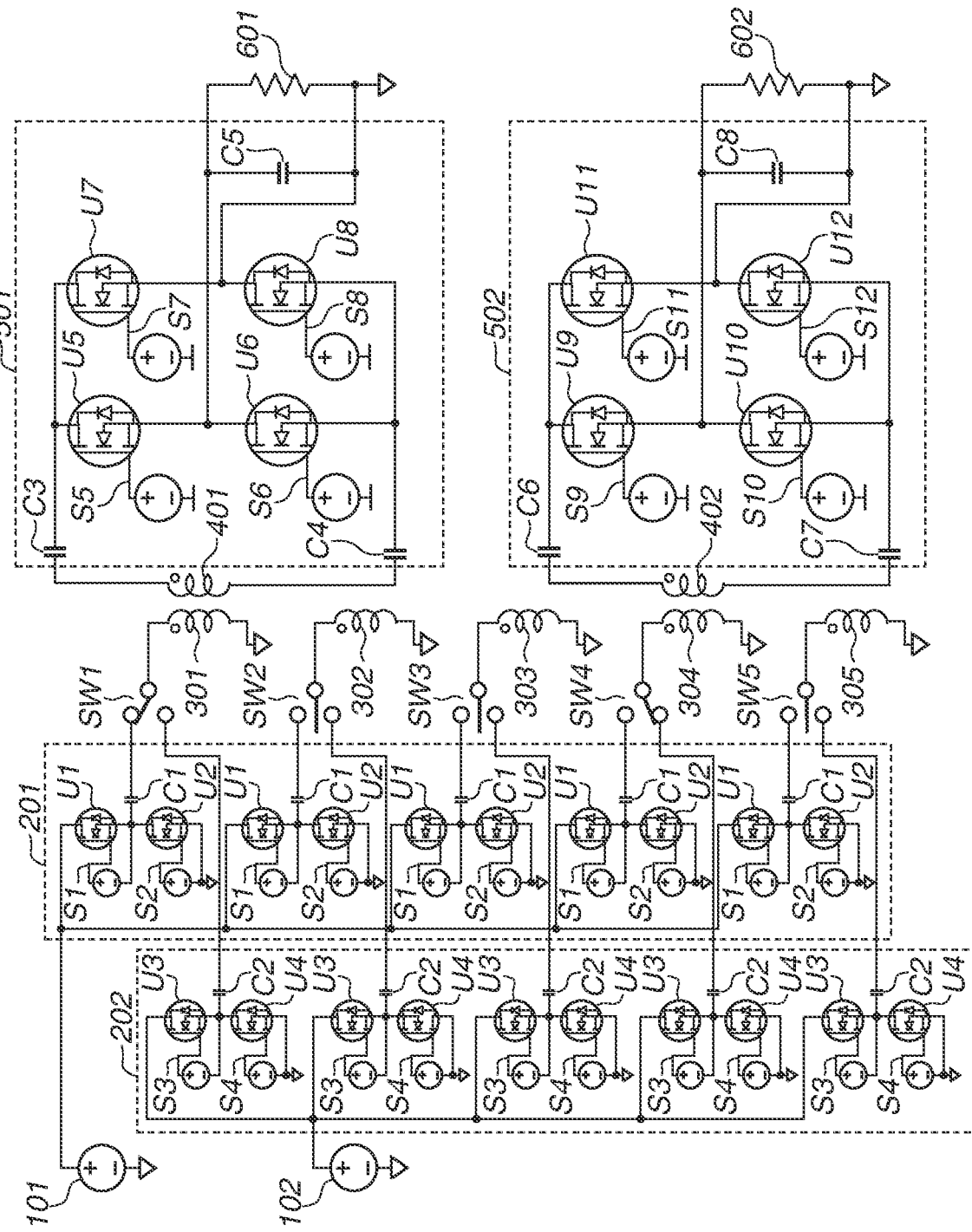
FIG. 9 is a diagram illustrating a configuration example of a wireless power transmission system according to one embodiment.

FIG. 9 is a diagram illustrating a configuration example of a wireless power transmission system 700 according to a fifth example embodiment.

The wireless power transmission system 700 of FIG. 9 is different from the wireless power transmission system 700 of FIG. 2 in power transmission circuits 201 and 202. Differences of FIG. 9 from FIG. 2 will hereinafter be described. In FIG. 2, the power transmission circuit 201 includes the pair of FETs U1 and U2 and the capacitor C1. The power transmission circuit 202 includes the pair of FETs U3 and U4 and the capacitor C2.

In contrast, in FIG. 9, the power transmission circuit 201 includes five sets containing FETs U1 and U2 and a capacitor C1. The five sets containing the FETs U1 and U2 and the capacitor C1 are connected to five power transmission coils 301 to 305 via five switches SW1 to SW5, respectively. As in FIG. 2, five pairs of FETs U1 and U2 each switch the output voltage of a driver 101 based on gate signals S1 and S2, and output the switched voltages to the power transmission coils 301 to 305 via the switches SW1 to SW5.

In FIG. 9, the power transmission circuit 202 includes five sets containing FETs U3 and U4 and a capacitor C2. The five sets containing the FETs U3 and U4 and the capacitor C2 are connected to the five power transmission coils 301 to 305 via the five switches SW1 to SW5, respectively.

As in FIG. 2, five pairs of FETs U3 and U4 each switch the output voltage of a driver 102 based on gate signals S3 and S4, and output the switched voltages to the power transmission coils 301 to 305 via the switches SW1 to SW5.

If the power reception coils are greater than the power transmission coils and a plurality of power transmission coils is opposed to one power reception coil, the plurality of power transmission coils may wirelessly transmit power to the one power reception coil.

A magnetic sheet or a metal plate may be disposed on a side of each power transmission coil not facing the power reception coils to reduce leakage of undesired radiation. For example, a magnetic sheet is disposed on the side of each power transmission coil not facing the power reception coils, and a metal plate is disposed on the opposite side of the magnetic sheet from the power transmission coil.

A magnetic sheet or a metal plate may also be disposed on a side of each power reception coil not facing the power transmission coils to reduce leakage of undesired radiation. For example, a magnetic sheet is disposed on the side of each power reception coil not facing the power transmission coils, and a metal plate is disposed on the side of the magnetic sheet opposite to the power reception coil.

As described above, in the first to fifth example embodiments, the power transmission circuit 201 outputs first power to be transmitted. The power transmission circuit 202 outputs second power to be transmitted. The plurality of power transmission coils is three or more power transmission coils for wirelessly transmitting the first power of the power transmission circuit 201 or the second power of the power transmission circuit 202.

The power reception coil 401 can move relative to the plurality of power transmission coils and is intended to wirelessly receive the first power of the power transmission circuit 201 from one of the power transmission coils. The power reception coil 402 can move relative to the plurality of power transmission coils and is intended to wirelessly receive the second power of the power transmission circuit 202 from one of the power transmission coils.

In FIG. 1, the switches SW1 to SW12 connect, among the plurality of power transmission coils 301 to 312, the power transmission coil 304 opposed to the power reception coil 401 to the power transmission circuit 201 and connect the power transmission coil 306 opposed to the power reception coil 402 to the power transmission circuit 202. In other words, the switches SW1 to SW12 connect one or more power transmission coils opposed to the power reception coil 401 to the power transmission circuit 201, and connect another one or more power transmission coils opposed to the power reception coil 402 to the power transmission circuit 202.

In FIG. 1, the wireless power transmission system 700 includes the main body 800 and the moving stage 900. The main body 800 is a power transmission apparatus, and includes the power transmission circuit 201, the power transmission circuit 202, the power transmission coils 301 to 312, and the switches SW1 to SW12. The moving stage 900 is a power reception apparatus. The moving stage 900 is movable relative to the main body 800, and includes the power reception coil 401, the power reception coil 402, the power reception circuit 501, and the power reception circuit 502.

In FIG. 8, the wireless power transmission system 700 includes the AGVs 711 to 713, and a main body (power transmission apparatus) 800 similar to that in FIG. 1. Each of the AGVs 711 to 713 is a power reception apparatus, and movable relative to the main body 800. The main body 800 includes the power transmission circuits 201 to 203, the power transmission coils 301 to 329, and the switches SW1 to SW29. The AGV 711 includes the power reception coil 401, the power reception circuit 501, and the motor 601. The AGV 712 includes the power reception coil 402, the power reception circuit 502, and the motor 602. The AGV 713 includes the power reception coil 403, the power reception circuit 503, and the motor 603.

As illustrated in FIGS. 2 and 9, the power transmission circuit 201 includes the FETs U1 and U2 for switching the power input from the driver 101. The power transmission circuit 202 includes the FETs U3 and U4 for switching the power input from the driver 102. The FETs U1 to U4 are examples of switches.

The FETs U1 and U2 switch based on the gate signals S1 and S2, respectively. The FETs U3 and U4 switch based on the gate signals S3 and S4, respectively. The gate signals S1 to S4 are examples of control signals.

The power reception circuit 501 includes the FETs U5 to U8 for synchronously rectifying the power wirelessly received by the power reception coil 401, and the capacitor C5 or a low-pass filter. The power reception circuit 502 includes the FETs U9 to U12 for synchronously rectifying the power wirelessly received by the power reception coil 402, and the capacitor C8 or a low-pass filter. The FETs U5 to U12 are examples of switches.

The FETs U5 to U8 switch based on the gate signals S5 to S8, respectively. The FETs U9 to U12 switch based on the gate signals S9 to S12, respectively. The gate signals S5 to S12 are examples of control signals.

As illustrated in FIG. 3, the gate signals S1 and S2 have the frequency f1. The gate signals S3 and S4 have the frequency f2. The gate signal S1 and S2 and the gate signals S3 and S4 have different frequencies.

The gate signals S5 to S8 have the frequency f1. The gate signals S9 to S12 have the frequency f2. The gate signals S5 to S8 and the gate signals S9 to S12 have different frequencies. The gate signals S1 and S2 and the gate signals S5 to S8 have the same frequency. The gate signals S3 and S4 and the gate signals S9 to S12 have the same frequency.

In FIG. 5, the gate signals S1 and S2 and the gate signals S3 and S4 have different phases. The gate signals S5 to S8 and the gate signals S9 to S12 also have difference phases. A phase difference between the gate signals S1 and S2 and the gate signals S3 and S4 and a phase difference between the gate signals S5 to S8 and the gate signals S9 to S12 are the same, which are 90°, for example.

The power reception circuit 501 restores the output power of the driver 101 by synchronous rectification, and supplies the restored output voltage to the motor 601. The power reception circuit 502 restores the output voltage of the driver 102 by synchronous rectification, and supplies the restored output voltage to the motor 602. The motors 601 and 602 are examples of loads.

In FIG. 1, the wireless power transmission system 700 can include a detection unit that detects the relative position of the power reception coil 401 with respect to the plurality of power transmission coils 301 to 312 and the relative position of the power reception coil 402 with respect to the plurality of power transmission coils 301 to 312. Examples of the detection unit may include an optical sensor and a camera.

A magnetic sheet or a metal plate is disposed on the side of the plurality of power transmission coils 301 to 312 not facing the power reception coil 401 or 402. Magnetic sheets or metal plates are disposed on the side of the power reception coils 401 and 402 not facing the plurality of power transmission coils 301 to 312.

In the first to fifth example embodiments, the power reception coils 401 and 402 can move relative to the plurality of power transmission coils. The power reception coils 401 and 402 share the plurality of power transmission coils. This can save the space for installing the plurality of power transmission coils. The power reception coils 401 and 402 wirelessly receive power from only the power transmission coils opposed to the respective power reception coils 401 and 402. The power transmission coils therefore do not need to be entirely covered with shielding members for reducing interference, and the interference-reducing mechanism can be simplified as compared to the case where power is transmitted from power transmission coils having the same length as the entire moving distance of the power reception coils or from the power transmission lines discussed in Japanese Patent Application Laid-Open No. 2017-99190.

All the foregoing example embodiments merely describe specific examples of embodiment of the present disclosure, and the interpretation of the technical scope of the present invention is not intended to be limited thereto. In other words, the present invention can be practiced in various forms without departing from the technical concept or essential features thereof.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-195539, filed Dec. 1, 2021, which is hereby incorporated by reference herein in its entirety.

What is claimed is:

1. A wireless power transmission system comprising:
    a first power transmission circuit configured to output first power;
    a second power transmission circuit configured to output second power;
    a plurality of power transmission coils including a first power transmission coil configured to wirelessly transmit the first power, a second power transmission coil configured to wirelessly transmit the second power, and a third power transmission coil positioned between and adjacent to the first power transmission coil and the second power transmission coil;
    a plurality of switches including a first switch connected to the first power transmission coil, a second switch connected to the second power transmission coil, and a third switch connected to the third power transmission coil;
    a first power reception coil configured to be movable relative to the plurality of power transmission coils and wirelessly receive the first power from the first power transmission coil in a case where the first power reception coil is opposed to the first power transmission coil; and
    a second power reception coil configured to be movable relative to the plurality of power transmission coils and wirelessly receive the second power from the second power transmission coil in a case where the second power reception coil is opposed to the second power transmission coil, wherein:
    the first power transmission coil opposed to the first power reception coil is configured to connect the first power transmission circuit by closing the first switch,
    the second power transmission coil opposed to the second power reception coil is configured to connect to the second power transmission circuit by closing the second switch, and
    the third switch connected to the third transmission coil is configured to remain open when the first switch and the second switch are closed.

2. The wireless power transmission system according to claim 1, further comprising:

a power transmission apparatus; and a power reception apparatus configured to be movable relative to the power transmission apparatus, wherein the power transmission apparatus includes the first power transmission circuit, the second power transmission circuit, the plurality of power transmission coils, and the plurality of switches, and wherein the power reception apparatus includes the first power reception coil and the second power reception coil.

3. The wireless power transmission system according to claim 1, further comprising:

a first power reception circuit configured to rectify the first power wirelessly received by the first power reception coil; and a second power reception circuit configured to rectify the second power wirelessly received by the second power reception coil.

4. The wireless power transmission system according to claim 3, wherein the first power reception circuit is configured to restore the first input power, and wherein the second power reception circuit is configured to restore the second input power.

5. The wireless power transmission system according to claim 4, wherein the first power reception circuit is configured to supply the restored first input power to a first load, and wherein the second power reception circuit is configured to supply the restored second input power to a second load.

6. The wireless power transmission system according to claim 1, further comprising a detection unit configured to detect a relative position of the first power reception coil with respect to the plurality of power transmission coils and a relative position of the second power reception coil with respect to the plurality of power transmission coils.

7. A method for controlling a wireless power transmission system including a first power transmission circuit configured to output first power; a second power transmission circuit configured to output second power; a plurality of power transmission coils including a first power transmission coil configured to wirelessly transmit the first power, a second power transmission coil configured to wirelessly transmit the second power, and a third power transmission coil positioned between and adjacent to the first power transmission coil and the second power transmission coil; a plurality of switches including a first switch connected to the first power transmission coil, a second switch connected to the second power transmission coil, and a third switch connected to the third power transmission coil; a first power reception coil configured to be movable relative to the plurality of power transmission coils and wirelessly receive the first power from the first power transmission coil in a case where the first power reception coil is opposed to the first power transmission coil; and a second power reception coil configured to be movable relative to the plurality of power transmission coils and wirelessly receive the second power from the second power transmission coil in a case where the second power reception coil is opposed to the second power transmission coil; the method comprising:

connecting the first power transmission coil opposed to the first power reception coil to the first power transmission circuit by closing the first switch; and connecting the second power transmission coil opposed to the second power reception coil to the second power transmission circuit by closing the second switch, wherein the third switch connected to the third transmission coil is configured to remain open when the first switch and the third switch are closed.

* * * * *